(12) United States Patent
Liu et al.

(10) Patent No.: US 11,106,434 B1
(45) Date of Patent: Aug. 31, 2021

(54) METHOD, DEVICE, AND COMPUTER PROGRAM PRODUCT FOR GENERATING PROGRAM CODE

(71) Applicant: EMC IP Holding Company LLC, Hopkinton, MA (US)

(72) Inventors: Jinpeng Liu, Shanghai (CN); Jin Li, Shanghai (CN); Jiacheng Ni, Shanghai (CN); Danqing Sha, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/997,342

(22) Filed: Aug. 19, 2020

(30) Foreign Application Priority Data

Jul. 31, 2020 (CN) .......................... 202010760123.0

(51) Int. Cl.
  G06F 9/44   (2018.01)
  G06F 8/30   (2018.01)
  G06N 20/00  (2019.01)
  G06F 8/71   (2018.01)
  G06F 8/41   (2018.01)

(52) U.S. Cl.
  CPC .............. *G06F 8/30* (2013.01); *G06F 8/447* (2013.01); *G06F 8/71* (2013.01); *G06N 20/00* (2019.01)

(58) Field of Classification Search
  CPC .. G06F 8/30; G06F 8/447; G06F 8/71; G06N 20/00
  USPC ......................................................... 717/106
  See application file for complete search history.

(56) References Cited

U.S. PATENT DOCUMENTS

| | | | | |
|---|---|---|---|---|
| 8,104,027 | B2 * | 1/2012 | Owen | G06F 9/45516 717/146 |
| 2004/0158577 | A1 * | 8/2004 | Chu | G06F 8/20 |
| 2009/0249368 | A1 * | 10/2009 | Needamangala | G06F 11/3668 719/328 |
| 2016/0350080 | A1 * | 12/2016 | Ravindran | G06F 8/20 |
| 2018/0136912 | A1 * | 5/2018 | Venkataramani | G06N 3/0454 |
| 2020/0005334 | A1 * | 1/2020 | Samson | G06Q 30/0239 |
| 2020/0050935 | A1 * | 2/2020 | Edelsten | G06N 3/082 |
| 2020/0257317 | A1 * | 8/2020 | Musk | G05D 1/12 |
| 2020/0257652 | A1 * | 8/2020 | Wang | G06F 8/41 |

(Continued)

OTHER PUBLICATIONS

Title: TVM: An automated end-to-end optimizing compiler for deep learning, author: T Chen et al, published on 2017.*

(Continued)

*Primary Examiner* — Chameli Das

(74) *Attorney, Agent, or Firm* — Ryan, Mason & Lewis, LLP

(57) ABSTRACT

Embodiments of the present disclosure relate to a method, a device, and a computer program product for generating program code. In one embodiment, a method for generating program code is disclosed, including: acquiring code configuration information that includes code function information indicating a target function and device configuration information of a target device; and generating program code based on the code configuration information, wherein when executed, the program code can cause the target device to implement the target function. Through the embodiments of the present disclosure, the diversity and flexibility of function implementation can be improved, and the workload of developing program code can be significantly reduced.

20 Claims, 6 Drawing Sheets

(56) References Cited

U.S. PATENT DOCUMENTS

2021/0142210 A1* 5/2021 Cheng ................. G06K 9/6256

OTHER PUBLICATIONS

Title: Evaluating deep learning approaches to characterize and classify malicious URL's, author: R Vinayakumar et al, published on 2018; source: Researchgate.net.*
Title: A distributed deep learning system for web attack detection on edge devices, author: Z Tian et al, published on 2019. Source: IEEE.*
K. Zhang et al., "Machine Learning-Based Temperature Prediction for Runtime Thermal Management Across System Components," IEEE Transactions on Parallel and Distributed Systems, Feb. 1, 2018, pp. 405-419, vol. 29, No. 2.
spark.apache.org, "Clustering—RDD-Based API," http://spark.apache.org/docs/latest/mllib-clustering.html, downloaded Jun. 27, 2019, 20 pages.
S. Ahmad et al., "Unsupervised Real-Time Anomaly Detection for Streaming Data," Neurocomputing, Apr. 22, 2017, pp. 134-147.
U.S. Appl. No. 16/536,599 filed in the name of Zhenzhen Lin et al. on Aug. 9, 2019, and entitled "Method, Device and Computer Program Product for Data Analysis."
U.S. Appl. No. 16/805,065 filed in the name of Ruixue Zhang et al. on Feb. 28, 2020, and entitled "Methods, Devices, and Computer Program Products for Model Adaptation."

* cited by examiner

401

```
# Section 1: code generated from the template or the configuration
# 1. import all necessary libs
# 1.1 import standard libs needed by the compiler, which can be hard-coded
import nnvm
import nnvm.compiler
import tvm
from tvm.contrib import graph_runtime
from tvm.contrib import util
import numpy as np
from mxnet.gluon.model_zoo.vision import get_model
from mxnet.gluon.utils import download
from PIL import Image

# 1.2 import framework libs to provide interfaces to different frameworks, and which framework should be used can be
decided by the schema and Application Analyzer
import mxnet as mx // if mxnet framework is used,

# 2. Download the model with the utilities
```

```
# the model url, can be decided by the configuration
synset_url = ''.join(['https://gist.githubusercontent.com/zhreshold/',
                      '4d0b62f3d01426887599d4f7ede23ee5/raw/',
                      '596b27d23537e5a1b5751d2b0481ef172f58b539/',
                      'imagenet1000_clsid_to_human.txt'])
synset_name = 'synset.txt' download(synset_url, synset_name)
```
— 410

```
# Section 2: the standard processing generated by the Code Generator
```

```
# 1. Import the model from other frameworks to TVM, the logic can be decided by the Application Analyzer
block = get_model('resnet18_v1', pretrained=True)
sym, params = nnvm.frontend.from_mxnet(block)
# we want a probability so add a softmax operator
sym = nnvm.sym.softmax(sym)
```
— 420

```
# 2. Compile the imported model with TVM
# 2.1 specify the target device, which can be decided by the Application Analyzer
target = 'cuda'
ctx = tvm.gpu()
```
— 430

```
# 2.2 shape_dict, the size of input image, which is determined by the model and therefore could be decided by the
configuration
shape_dict = {'data': (1, 3, 224, 224)}
```
— 440

```
# 2.3 standard configuration used by TVM
with nnvm.compiler.build_config(opt_level=3):
    graph, lib, params = nnvm.compiler.build(sym, target, shape_dict, params=params)
# 2.4 generate the intermediate representation the deployment runtime library, standard process
module = graph_runtime.create(graph, lib, ctx)
```

3. Save the compiling intermediate result to disk, which could be executed by deploying them into local device or
executed in the server by sending the intermediate to client. The intermediate includes a runtime lib - deploy_lib.tar, a IR of
the model - deploy_graph.json and the trained parameters - deploy_param.params. With all these three files, the inference
program can be executed in the specified target device, in our case, a CUDA GPU

```
# 1. import all necessary libs
# 1.1 import standard libs needed by the compiler
import numpy as np
import nnvm.compiler
import nnvm.testing
import tvm
from tvm.contrib import graph_runtime
from tvm.contrib import util
import sys

# 1.2 import utility libs, standard
from mxnet.gluon.utils import download
from PIL import Image synset_name = 'synset.txt'
```

```
# 1.3 The user sensitive data, which is the inference program target, is stored locally and passed into the program from   ─ 450
command line argument argv[1]
img_name = sys.argv[1]
```

```
# 2 some pre-process according to the application, which could be decided by the Application Analyzer                      ─ 460
# input data type, which is determined by the model and therefore could be decided by the schema
dtype = 'float32'
```

```
with open(synset_name) as f:
    synset = eval(f.read())

# open the input image and input it to the model
image = Image.open(img_name).resize((224, 224))

def transform_image(image):
    image = np.array(image) - np.array([123., 117., 104.])
    image /= np.array([58.395, 57.12, 57.375])
    image = image.transpose((2, 0, 1))
    image = image[np.newaxis, :]
    return image x = transform_image(image)

3. Execute the inference
# 3.1 load the intermediate result from disk
loaded_json = open("m.json").read()
loaded_lib = tvm.module.load("m.tar")
loaded_params = bytearray(open("m.params", "rb").read())

ctx = tvm.gpu()
module = graph_runtime.create(loaded_json, loaded_lib, ctx)

module.set_input('data', tvm.nd.array(x.astype(dtype)))
module.load_params(loaded_params)

# 3.2 run the inference, standard process
module.run()
```

FIG. 4B

METHOD, DEVICE, AND COMPUTER PROGRAM PRODUCT FOR GENERATING PROGRAM CODE

RELATED APPLICATION(S)

The present application claims priority to Chinese Patent Application No. 202010760123.0, filed Jul. 31, 2020, and entitled "Method, Device, and Computer Program Product for Generating Program Code," which is incorporated by reference herein in its entirety.

FIELD

Embodiments of the present disclosure generally relate to the field of computers, and in particular, to a method, a device, and a computer program product for generating program code.

BACKGROUND

With the development of artificial intelligence technologies, increasingly more fields use deep learning models to implement more accurate inferences. However, a training process of a deep learning model is often time-consuming and resource-consuming. Therefore, the training of the deep learning model is usually performed on a device with a strong computing capability, and the use of the deep learning model can be performed on another device as needed. When the deep learning model is updated, for example, updated because of the appearance of a new feature and a new category, program code that uses the deep learning model (sometimes also referred to as inference program code) also needs to be updated accordingly. At present, the process of updating the inference program code is performed manually, which brings great inconvenience to the use of the deep learning model.

In addition, the inference program code is often written according to specific functions or applications. Therefore, specific program code can only implement specific functions or applications. This limits the flexibility of using the deep learning model.

SUMMARY

A method, a device, and a computer program product for generating program code are provided in embodiments of the present disclosure.

In a first aspect of the present disclosure, a method for generating program code is provided, the method comprising: acquiring code configuration information that includes code function information indicating a target function and device configuration information of a target device; and generating program code based on the code configuration information, wherein when executed, the program code can cause the target device to implement the target function.

In a second aspect of the present disclosure, a computing device is provided. The device includes: at least one processing unit; and at least one memory, wherein the at least one memory is coupled to the at least one processing unit and stores instructions configured to be executed by the at least one processing unit, which, when executed by the at least one processing unit, cause the device to execute actions including: acquiring code configuration information that includes code function information indicating a target function and device configuration information of a target device; and generating program code based on the code configuration information, wherein when executed, the program code can cause the target device to implement the target function.

In a third aspect of the present disclosure, a computer program product is provided. The computer program product is tangibly stored in a non-transitory computer storage medium and includes machine-executable instructions. The machine-executable instructions, when executed by a device, cause the device to execute any step of the method described according to the first aspect of the present disclosure.

This Summary is provided to introduce the choice of concepts in a simplified form, which will be further described in the following Detailed Description. The Summary is neither intended to identify important features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

FIG. 4A is a schematic diagram of an example first code program segment according to an embodiment of the present disclosure;

FIG. 4B is a schematic diagram of an example second code program segment according to an embodiment of the present disclosure.

In the accompanying drawings, the same or corresponding numerals represent the same or corresponding parts.

DETAILED DESCRIPTION

Figure 1:
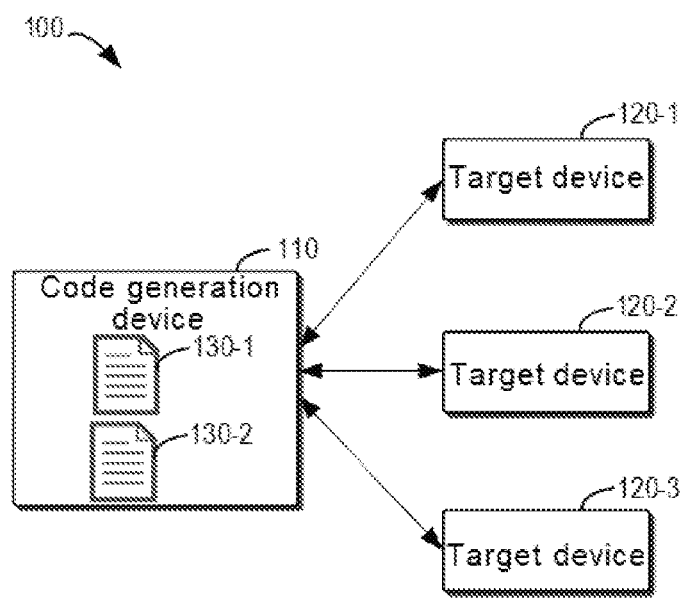
FIG. 1 is a block diagram of an example code generation system in which an embodiment of the present disclosure can be implemented.

Illustrative embodiments of the present disclosure will be described in more detail below with reference to the accompanying drawings. Although illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

As mentioned above, with the development of artificial intelligence technologies, increasingly more fields use deep learning models to implement more accurate inferences. For example, in an Internet of Things (IoT) scenario, an edge server can make more accurate predictions on various collected data by using deep learning models such as those trained in a cloud. In an online inference service scenario, a server can use deep learning models to infer from data uploaded by users such as images, texts, and voices, so as to, for example, recognize types of flowers in images, analyze and diagnose medical reports, and the like.

However, a training process of a deep learning model is often time-consuming and resource-consuming. Therefore, the training of the deep learning model is usually performed on a device with a strong computing capability, and the use of the deep learning model can be performed on another device as needed. When the deep learning model is updated, for example, updated because of the appearance of a new feature and a new category, program code (sometimes also referred to as inference program code) that uses the deep learning model also needs to be updated accordingly. For example, a structure, parameters, and the like of a neural network are adjusted. At present, the process of updating the inference program code is performed manually, which brings great inconvenience to the use of the deep learning model.

In addition, the inference program code is often written according to specific functions or applications. Therefore, specific program code can only implement specific functions or applications. This limits the diversity and flexibility of function implementation.

Embodiments of the present disclosure provide a solution for generating program code to solve one or more of the above problems and other potential problems. The solution acquires code configuration information, and generates program code according to the code configuration information. In this way, the process of generating program code can be automated, thereby significantly reducing the workload of developing program code. In addition, the diversity and flexibility of function implementation are also improved.

FIG. 1 is a block diagram of example code generation system 100 in which an embodiment of the present disclosure can be implemented. As shown in FIG. 1, code generation system 100 includes code generation device 110 and target devices 120-1 to 120-3 (collectively referred to as target device 120). Various methods according to the embodiments of the present disclosure may be implemented at a computing device such as code generation device 110.

As shown in FIG. 1, code generation device 110 may acquire code configuration information from target device 120, and generate program code 130-1 and 130-2 (collectively referred to as program code 130) that can be deployed to target device 120 according to the code configuration information. Code generation device 110 may be, for example, a computer, a virtual machine, or a server. Code generation device 110 may also be a computing device in a cloud. Target device 120 may be a computer, a server, a smart phone, a tablet computer, a smart watch, and the like. Code generation device 110 and target device 120 may be connected via a network. The network may be the Internet, an intranet, or the like. The present disclosure is not limited in these regards.

It should be understood that the structure of code generation system 100 is described for illustrative purposes only, and does not imply any limitation to the scope of the present disclosure. For example, the embodiments of the present disclosure may also be applied to a system different from code generation system 100. It should be understood that the specific number of the above devices is given for illustrative purposes only, and does not imply any limitation to the scope of the present disclosure. For example, the embodiments of the present disclosure may also be applied to more code generation devices and more or fewer target devices. The code generation device may also acquire code configuration information from devices other than the target device.

Figure 2:
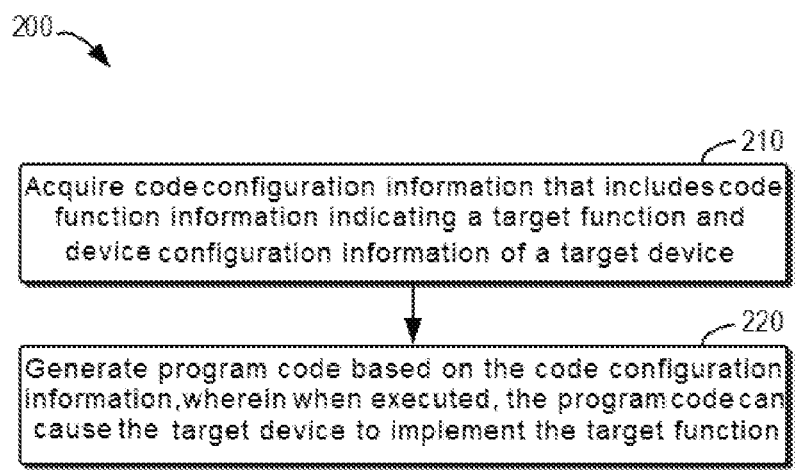
FIG. 2 is a flowchart of an example method for generating program code according to an embodiment of the present disclosure.

FIG. 2 is a flow chart of example method 200 for managing program code according to an embodiment of the present disclosure. For example, method 200 may be performed by code generation device 110 as shown in FIG. 1. It should be appreciated that method 200 may also be performed by other devices, and the scope of the present disclosure is not limited in this regard. It should also be appreciated that method 200 may also include additional actions not shown and/or omit the actions shown, and the scope of the present disclosure is not limited in this regard.

In 210, code generation device 110 acquires code configuration information that includes code function information indicating a target function and device configuration information of a target device.

In some embodiments, the target function may be, for example, image recognition, image classification, voice recognition, text recognition, video processing, and the like.

In some embodiments, code generation device 110 may acquire a deep learning model for implementing the target function. For example, the deep learning model has been trained at a facility with a powerful computing capability, such as a cloud, to implement the target function. For example, in some embodiments, the deep learning model may be CIFAR-10, ResNet-50, and the like.

Additionally or alternatively, in some embodiments, code generation device 110 may acquire a type of a development framework used for training the deep learning model. For example, the development framework may be TensorFlow, MxNET, PyTorch, Keras, and the like. Each development framework has a different application programming interface API to be called by the inference program code, and different runtime libraries for the execution of the inference program code.

Alternatively or additionally, code generation device 110 may determine a uniform resource locator (URL) pointing to the deep learning model according to the type of the deep learning model.

Additionally or alternatively, in some embodiments, code generation device 110 may acquire input data information related to data to be input to the program code. For example, code generation device 110 may acquire information about the type of input data. For example, the input data may be of an image, a text, a video, or a customized type. Code generation device 110 may also acquire information about the size, the location, and the like of the input data. Alternatively or additionally, code generation device 110 may also acquire the input data itself.

In an embodiment in which code generation device 110 does not acquire the input data itself, the input data itself may be retained in the target device without being exposed to code generation device 110. Code generation device 110 may deploy the generated program code to the target device after the program code is generated, and cause the program code to read input data on the target device. In this way, the security of the input data can be improved. For example, the security of sensitive input data such as medical reports is improved.

In some embodiments, code generation device 110 may acquire a type of a computing platform of the target device. For example, the computing platform type of the target device may be a Compute Unified Device Architecture (CUDA), a Graphics Processing Unit (GPU), an X86_64 Central Processing Unit (CPU), an Advanced Reduced Instruction Set Computer (RISC) Machines (ARM), a Field-Programmable Gate Array (FPGA), an Application-Specific Integrated Circuit (ASIC), a web browser, and the like. Alternatively or additionally, code generation device 110 may acquire a model of the target device, and then determine the type of the computing platform of the target device according to the model of the target device.

Additionally, in some embodiments, code generation device 110 may also determine a programming language suitable for the target device, so as to use the suitable programming language to write the program code. For example, Python language suitable for running in CPU, CUDA suitable for running in NVIDIA GPU, OpenCL suitable for running in AMD GPU, JavaScript suitable for running in a JS web browser, Verilog suitable for running in FPGA, and the like. Alternatively, in some embodiments, code generation device 110 may use any programming language to generate the program code.

Alternatively, in some embodiments, code generation device 110 may only acquire input data information, and then select a deep learning model suitable for the input data, a development framework of the deep learning model, and the like from known deep learning models according to the input data information. In such an embodiment, a user may not be an expert user who understands deep learning, but only needs to provide input data to implement the target function. For example, the user may provide an image including flowers to code generation device 110, and then code generation device 110 may select, based on the image, a deep learning model suitable for recognizing flowers and a development framework of the deep learning model.

In 220, code generation device 110 generates program code according to the code configuration information, and when executed, the program code can cause the target device to implement the target function.

In some embodiments, code generation device 110 may input the acquired code function information and device configuration information into a cross-development-framework deep learning compiler, and use a process and an API provided by the compiler to generate the program code. For example, in some embodiments, the cross-development-framework deep learning compiler may be TVM, ONNX, or the like. The cross-development-framework deep learning compiler has the capability of providing interfaces to different deep learning models and different development frameworks, and has the capability of generating code for devices of different computing platform types.

In some embodiments, code generation device 110 may generate a first program code segment and a second program code segment according to the code configuration information. The first program code segment, when executed, generates an intermediate representation of the deep learning model suitable for implementing the target function on the target device, and the second program code segment, when executed, implements the target function on the target device by calling the intermediate representation.

For example, in some embodiments, code generation device 110 may generate the first program code segment according to the code configuration information. For example, the first program code segment may be programmed to, when executed, download the deep learning model. For example, the deep learning model may be downloaded from a uniform resource locator pointing to the deep learning model, and the downloaded deep learning model may be compiled through the development framework into the intermediate representation of the deep learning model and a deployment runtime library, wherein the intermediate representation may include parameters used by the deep learning model, and the like.

In some embodiments, code generation device 110 may generate the second program code segment according to the code configuration information. For example, in some embodiments, the second program code segment may be programmed to, when executed, read the intermediate representation and the deployment runtime library of the deep learning model generated by the first program code segment and input data of the user, for executing, on the target device, the target function on the input data of the user.

It should be appreciated that the type of the deep learning model, the type of the development framework, the type of the computing platform, and the like are shown for exemplary purposes only and do not imply any limitation to the present disclosure. For example, the embodiments of the present disclosure may also use other deep learning models and other development frameworks, and may be applied to other types of computing platforms.

In the above example embodiment, by generating the program code according to the acquired code function information and the device configuration information of the target device, the process of generating the program code can be automated, thereby significantly reducing the workload of developing the program code. In addition, different target functions can be implemented, which improves the diversity and flexibility of function implementation.

Figure 3:
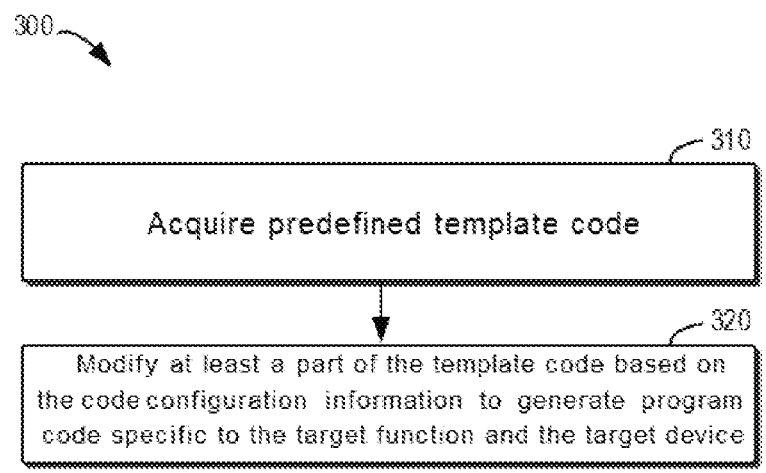
FIG. 3 is a flowchart of a method for generating program code according to an embodiment of the present disclosure.

FIG. 3 is a flowchart of method 300 for generating program code according to an embodiment of the present disclosure. Method 300 is an embodiment of 220 in method 200. For example, method 300 may be performed by code generation device 110 as shown in FIG. 1. It should be understood that method 300 may also be executed by other devices. The scope of the present disclosure is not limited in this regard. It should be further understood that method 300 may further include additional actions that are not shown and/or may omit actions that are shown. The scope of the present disclosure is not limited in this regard.

In 310, code generation device 110 acquires predefined template code related to the target function. Because there are many fixed parts in the program code for implementing the target function, code generation device 110 may first acquire the template code for implementing the target function.

In 320, code generation device 110 modifies at least a part of the template code, based on the code configuration information, to generate program code specific to the target function and the target device. FIG. 3 is described below with reference to FIG. 4A and FIG. 4B.

FIG. 4A is schematic diagram 401 of an example first code program segment according to an embodiment of the present disclosure. FIG. 4B is schematic diagram 402 of an example second code program segment according to an embodiment of the present disclosure.

Code generation device 110 may acquire predefined template code and then modify at least a part of the template code. In the embodiment of the first code program segment shown in FIG. 4A, a variable synset_url in block 410 indicates a resource identifier of the deep learning model, so as to download, according to the resource identifier, the deep learning model specified or determined based on the target function. A function get_model in block 420 indicates to use the specified development framework to call the deep learning model, which is the development framework used for training the deep learning model. In this embodiment, the specified development framework is resnet18_v1. A variable target in block 430 indicates the type of the computing platform of the target device. A variable shape_dict in block 440 indicates the size of the input image. In the embodiment of the second code program segment shown in FIG. 4B, a variable img_name in block 450 indicates the name of the input data. A variable dtype in block 460 indicates the type of the input data, and the variable is related to the used deep learning model.

In the above example embodiment, the program code specific to the target function and the target device is generated by modifying at least a part of the template code segment, so that it is possible to automatically generate the program code that implements different target functions on different target devices.

Figure 5:
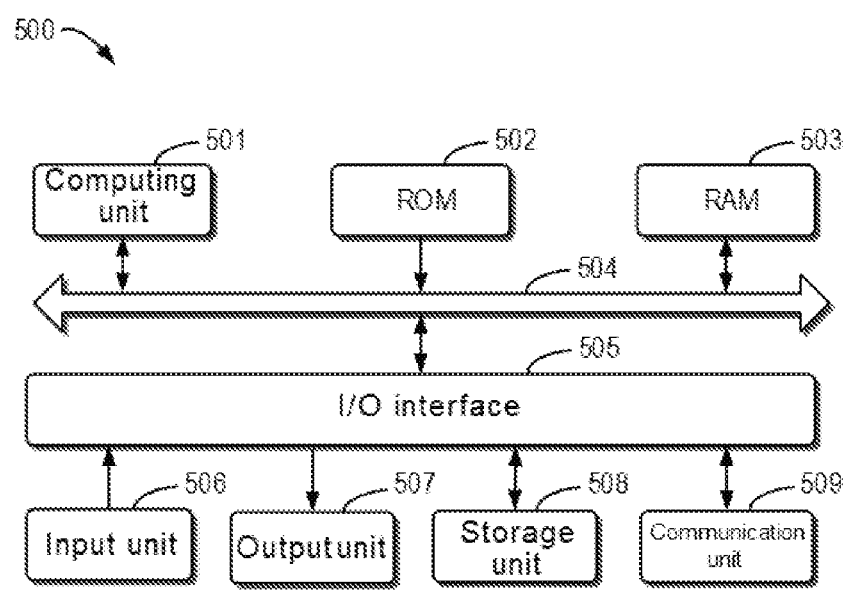
FIG. 5 is a schematic block diagram of an example device that can be used to implement an embodiment of the present disclosure.

FIG. 5 is a schematic block diagram of example computing device 500 that can be configured to implement an embodiment of content of the present disclosure. For example, code generation device 110 as shown in FIG. 1 may be implemented by device 500. As shown in FIG. 5, device 500 includes computing unit 501 (e.g., CPU) that may execute various appropriate actions and processing in accordance with computer program instructions stored in read-only memory (ROM) 502 or computer program instructions loaded onto random access memory (RAM) 503 from storage unit 508. In RAM 503, various programs and data required for the operation of device 500 may also be stored. Computing unit 501, ROM 502, and RAM 503 are connected to each other by bus 504. Input/output (I/O) interface 1005 is also connected to bus 504.

A plurality of members in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices via a computer network such as the Internet and/or various telecommunication networks.

The processes and processing described above, such as methods 200 and 300, may be executed by computing unit 501. For example, in some embodiments, method 200 and method 300 may be implemented as a computer software program that is tangibly included in a machine-readable medium, such as storage unit 508. In some embodiments, some or all of the computer programs may be loaded and/or installed onto device 500 via ROM 502 and/or communication unit 509. When the computer programs are loaded to RAM 503 and executed by computing unit 501, one or more actions in method 200 and method 300 described above can be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, RAM, ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, such as a programmable logic circuit, an FPGA, or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using computer-readable program instructions.

The computer-readable program instructions can be provided to a processing apparatus of a general purpose computer, a special purpose computer, or another programmable data processing apparatus to produce a machine, such that the instructions, when executed by the processing apparatus of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture that includes instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, and to otherwise enable persons of ordinary skill in the art to understand the embodiments disclosed herein.

What is claimed is:

1. A method for generating program code, comprising:
   acquiring code configuration information that comprises code function information indicating a target function and device configuration information of a target device; and
   generating program code based on the code configuration information, wherein when executed, the program code can cause the target device to implement the target function;
   wherein acquiring the code function information comprises acquiring a deep learning model configured to implement the target function;
   wherein generating the program code comprises:
   generating a first program code segment and a second program code segment, wherein the first program code segment, when executed, generates an intermediate representation of the deep learning model suitable for implementing the target function on the target device, and the second program code segment, when executed, implements the target function on the target device by calling the intermediate representation;
   wherein the deep learning model is acquired at least in part by downloading deep learning model information from a designated resource location; and
   wherein the intermediate representation of the deep learning model is generated at least in part by compiling the downloaded deep learning model information through a development framework.

2. The method according to claim 1, wherein acquiring the code function information further comprises acquiring at least one of the following:
   input data information related to data to be input into the program code; and
   a type of a development framework used for training the deep learning model.

3. The method according to claim 1, wherein acquiring the device configuration information comprises acquiring at least one of following: a type of a computing platform of the target device and a model of the target device.

4. The method according to claim 1, wherein generating the program code further comprises:
   acquiring predefined template code related to the target function; and
   modifying at least a part of the predefined template code based on the code configuration information to generate the program code specific to the target function and the target device.

5. The method according to claim 1, wherein generating the program code further comprises:
   inputting the code function information and the device configuration information into a cross-development-framework deep learning compiler to generate the program code.

6. The method according to claim 1, wherein the designated resource location is identified by a uniform resource locator that points to the deep learning model.

7. The method according to claim 1, wherein the target function comprises one or more of image recognition, image classification, voice recognition, text recognition and video processing.

8. A computing device, comprising:
   at least one processor; and
   at least one memory storing computer program instructions, wherein the at least one memory and the computer program instructions are configured to cause, with the at least one processor, the computing device to perform actions comprising:

acquiring code configuration information that comprises code function information indicating a target function and device configuration information of a target device; and generating program code based on the code configuration information, wherein when executed, the program code can cause the target device to implement the target function;

wherein acquiring the code function information comprises acquiring a deep learning model configured to implement the target function;

wherein generating the program code comprises:

generating a first program code segment and a second program code segment, wherein the first program code segment, when executed, generates an intermediate representation of the deep learning model suitable for implementing the target function on the target device, and the second program code segment, when executed, implements the target function on the target device by calling the intermediate representation;

wherein the deep learning model is acquired at least in part by downloading deep learning model information from a designated resource location; and wherein the intermediate representation of the deep learning model is generated at least in part by compiling the downloaded deep learning model information through a development framework.

9. The computing device according to claim 8, wherein acquiring the code function information further comprises acquiring at least one of the following:

input data information related to data to be input into the program code; and a type of a development framework used for training the deep learning model.

10. The computing device according to claim 8, wherein acquiring the device configuration information comprises acquiring at least one of following: a type of a computing platform of the target device and a model of the target device.

11. The computing device according to claim 8, wherein generating the program code further comprises:

acquiring predefined template code related to the target function; and modifying at least a part of the predefined template code based on the code configuration information to generate the program code specific to the target function and the target device.

12. The computing device according to claim 8, wherein generating the program code further comprises:

inputting the code function information and the device configuration information into a cross-development-framework deep learning compiler to generate the program code.

13. The computing device according to claim 8, wherein the designated resource location is identified by a uniform resource locator that points to the deep learning model.

14. A non-transitory computer-readable storage medium storing machine-executable instructions, wherein when executed by at least one processor, the machine-executable instructions cause the at least one processor to implement a method for generating program code, the method comprising:

acquiring code configuration information that comprises code function information indicating a target function and device configuration information of a target device; and generating program code based on the code configuration information, wherein when executed, the program code can cause the target device to implement the target function;

wherein acquiring the code function information comprises acquiring a deep learning model configured to implement the target function;

wherein generating the program code comprises:

generating a first program code segment and a second program code segment, wherein the first program code segment, when executed, generates an intermediate representation of the deep learning model suitable for implementing the target function on the target device, and the second program code segment, when executed, implements the target function on the target device by calling the intermediate representation;

wherein the deep learning model is acquired at least in part by downloading deep learning model information from a designated resource location; and wherein the intermediate representation of the deep learning model is generated at least in part by compiling the downloaded deep learning model information through a development framework.

15. The non-transitory computer-readable storage medium according to claim 14, wherein acquiring the code function information further comprises acquiring at least one of the following:

input data information related to data to be input into the program code; and a type of a development framework used for training the deep learning model.

16. The non-transitory computer-readable storage medium according to claim 14, wherein acquiring the device configuration information comprises acquiring at least one of following: a type of a computing platform of the target device and a model of the target device.

17. The non-transitory computer-readable storage medium according to claim 14, wherein generating the program code further comprises:

acquiring predefined template code related to the target function; and modifying at least a part of the predefined template code based on the code configuration information to generate the program code specific to the target function and the target device.

18. The non-transitory computer-readable storage medium according to claim 14, wherein generating the program code further comprises:

inputting the code function information and the device configuration information into a cross-development-framework deep learning compiler to generate the program code.

19. The non-transitory computer-readable storage medium according to claim 14, wherein the designated resource location is identified by a uniform resource locator that points to the deep learning model.

20. The non-transitory computer-readable storage medium according to claim 14, wherein the target function comprises one or more of image recognition, image classification, voice recognition, text recognition and video processing.

* * * * *